United States Patent [19]

Cardi

[11] 4,203,467
[45] May 20, 1980

[54] PRESSURE EQUALIZING VALVE

[76] Inventor: Paul Cardi, 1375 Park Ave., Cranston, R.I. 02920

[21] Appl. No.: 931,202

[22] Filed: Aug. 4, 1978

[51] Int. Cl.$^2$ .............................................. E03B 7/07
[52] U.S. Cl. .................................. 137/557; 137/227; 137/510; 152/415; 73/146.8
[58] Field of Search ...................... 137/510, 225, 227; 152/415, 427, 429; 73/146.8

[56] References Cited

U.S. PATENT DOCUMENTS

| | | | |
|---|---|---|---|
| 347,516 | 8/1886 | Sargent | 137/510 |
| 1,290,030 | 1/1919 | Acebal | 137/510 |
| 1,483,701 | 2/1924 | Weber | 137/227 X |
| 2,314,965 | 3/1943 | Sautu | 137/510 X |
| 2,789,617 | 4/1957 | Cardi | 152/415 |
| 3,079,974 | 3/1963 | Cardi | 137/510 X |
| 3,799,037 | 3/1974 | Schmidt | 137/227 X |
| 4,058,009 | 11/1977 | Etter-Felix | 137/222 X |

Primary Examiner—Harold W. Weakley

[57] ABSTRACT

A pressure equalizing valve featuring a housing defining a chamber, the housing having first and second passages therethrough opening into the chamber; a valve seat in the chamber surrounding the opening of the second passage thereinto; a diaphragm having its periphery sealed to the housing and forming a wall of the chamber adjacent to the valve seat; resilient means on the side of the diaphragm opposite the valve seat for urging the diaphragm against the seat with a predetermined force, to seal the second passage from the chamber, and hence from the first passage; and an indicator mounted on the housing and having a pressure responsive portion in communication with the chamber for indicating when the air pressure therein is below a predetermined value just sufficient to overcome the predetermined force and unseal the second passage.

12 Claims, 2 Drawing Figures

PRESSURE EQUALIZING VALVE

BACKGROUND OF THE INVENTION

This invention relates to equalizing tire pressure in dual tires and allowing convenient visual determination of that pressure. It is particularly useful in connection with dual tires commonly used on trucks.

In my U.S. Pat. No. 2,789,617 I describe a pressure equalizing valve in which two chambers, each in communication with one of the tires, are connected to each other by two passages. Each passage is sealed at one end by a valve member connected to a diaphragm which is acted upon by the pressure in that chamber. Upon inflation through the single fitting connected to one of the chambers, the diaphragm in that chamber is lifted, allowing air to move through one of the passages to the other chamber. When the pressure in the second chamber reaches a certain value, the valve member and diaphragm in that chamber will also move to an open position, and the chambers will be in communication through both passages.

In my U.S. Pat. No. 3,079,974 I describe a device in which each tire is connected to a separate chamber within a valve, and each chamber has its own inflation fitting. The chambers are connected by a long passage sealed at each end with a diaphragm responsive to the pressure existing in the tire connected to that chamber.

In Spicer U.S. Pat. No. 1,882,455 a single inflation fitting feeds two tire fittings, the passage of one tire fitting being sealed when the pressure falls to a certain cutoff value.

Denmire U.S. Pat. No. 1,849,139 discloses a tire pressure indicator connected to a pressure equalizing valve through a long tube and a pressure linkage system mounted on the wheel hub.

SUMMARY OF THE INVENTION

The present invention provides a pressure indicating, pressure equalizing valve of simple, inexpensive and reliable construction.

In general the invention features a housing defining a chamber, the housing having first and second passages therethrough opening into the chamber; a valve seat in the chamber surrounding the opening of the second passage thereinto; a diaphragm having its periphery sealed to the housing and forming a wall of the chamber adjacent to the valve seat; resilient means on the side of the diaphragm opposite the valve seat for urging the diaphragm against the seat with a predetermined force, to seal the second passage from the chamber, and hence from the first passage; and an indicator mounted on the housing and having a pressure responsive portion in communication with the chamber for indicating when the air pressure therein is below a predetermined value just sufficient to overcome the predetermined force and unseal the second passage.

In preferred embodiments, the indicator is capable of indicating values of pressure in the chamber over a range of pressures above and below the predetermined value, and consists of a second diaphragm and a pressure indicator rod in contact with a first side of the second diaphragm, and a portion of the housing adjacent the second diaphragm has a passage therethrough communicating between the second side of the second diaphragm and the chamber, the indicator being mounted in a cap attached to the housing and forming a removable portion thereof; the resilient means urging the diaphragm against the seat consist of a cap attached to the housing and removable therefrom, and a spring mounted within the cap, one end of the spring being in contact with an insert threaded into the cap, the insert being capable of rotation relative to the cap whereby the stress existing in the spring may be calibrated over a range of values, the periphery of the diaphragm being sandwiched between the housing to provide the sealing of the periphery to the housing; a partition divides the chamber into first and second compartments respectively communicating with the diaphragm and the pressure responsive portion of the indicator, the partition having a permanently open third passage therethrough connecting the compartments, the first passage communicating with the third passage, the second passage having a first portion extending within the partition parallel to the diaphragm, and a second portion extending within the partition perpendicular to the diaphragm, the termination of the second portion being surrounded by the valve seat, a valving extension being on and perpendicular to the partition, the second portion of the second passage passing through the valving extension and the valve seat being the termination of the valving extension adjacent the diaphragm, the valving extension being formed integral with the partition; and a mounting bolt is attached to the housing.

DESCRIPTION OF THE PREFERRED EMBODIMENT

We turn now to the structure and operation of a preferred embodiment of the invention, after first briefly describing the drawings.

Drawings

Structure

Figure 1:
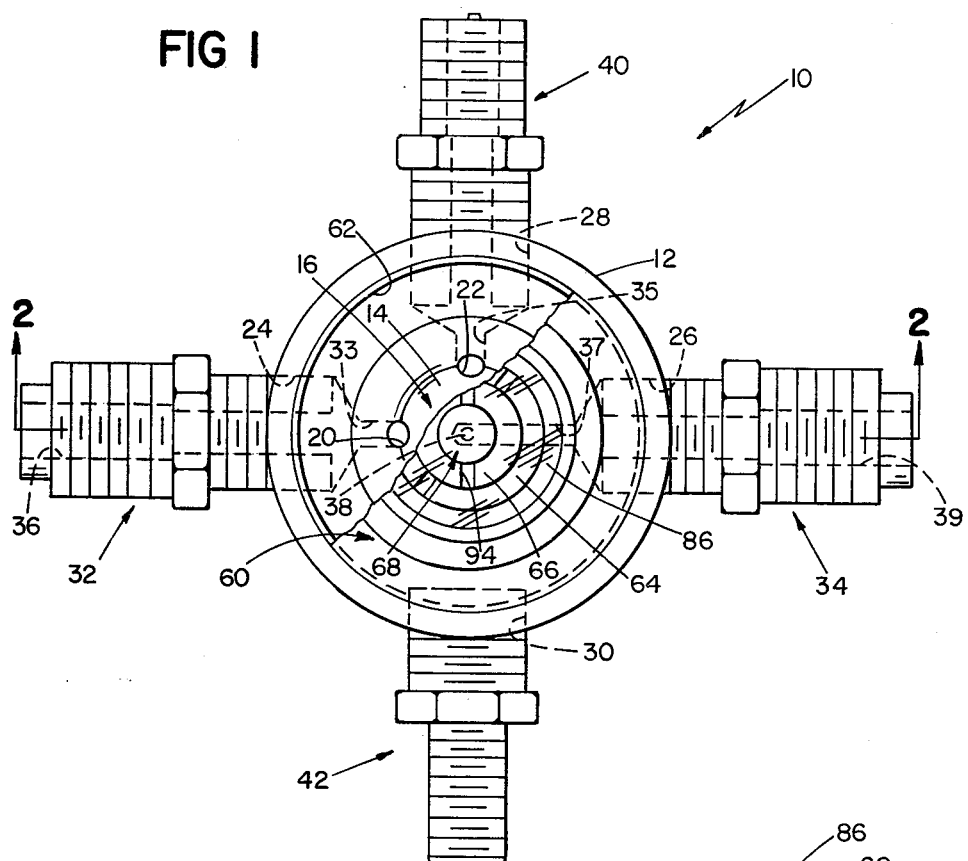
FIG. 1 is a top plan view, partially broken away, of a pressure equalizing valve embodying the invention.
Figure 2:
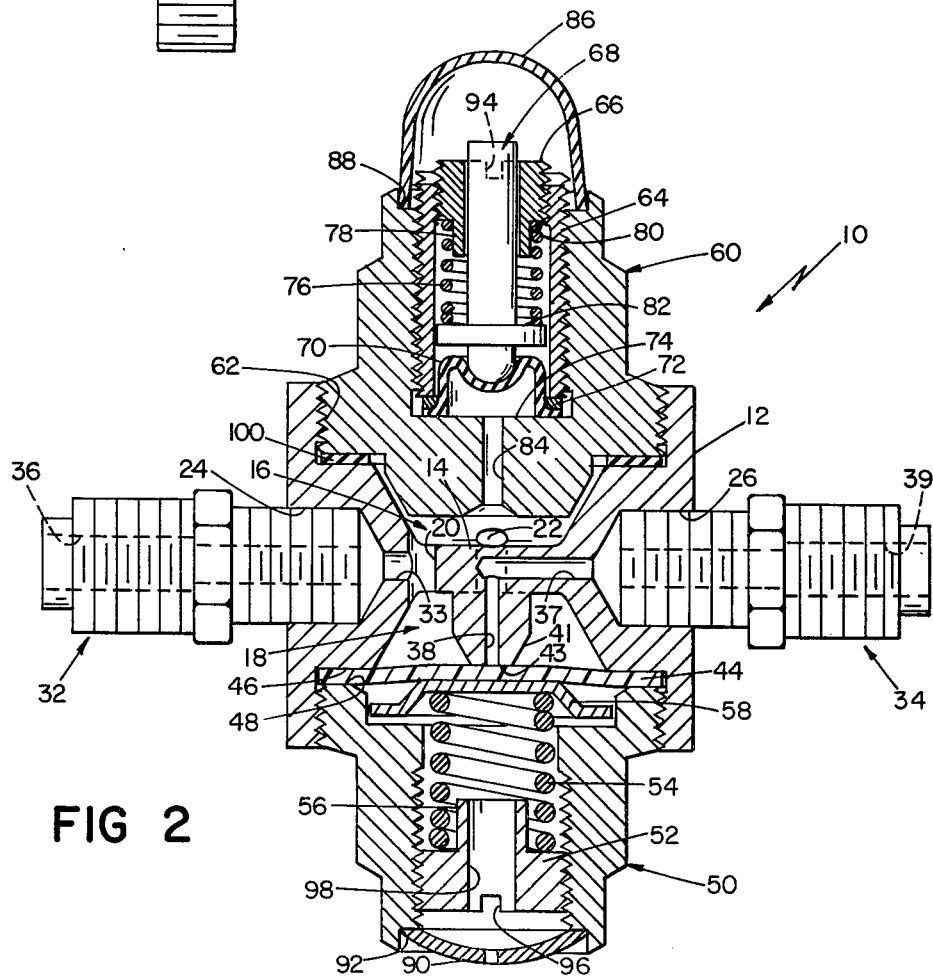
FIG. 2 is a sectional view taken along line 2—2 of FIG. 1.

Referring to the drawings, pressure equalizing valve 10 has a housing 12, durable enough to withstand road shock, gravel, and the like. Partition 14, integral with the housing, divides its interior into upper air chamber 16 and lower air chamber 18, connected by passages 20, 22 through partition 14.

Housing 12 is drilled and tapped with four internally threaded recesses 24, 26, 28, 30. Externally threaded tire connectors 32, 34, having passages 36, 39, are received in recesses 24, 26. Similarly, externally threaded inflation fitting 40 and mounting bolt 42 are received in recesses 28, 30.

Recess 24 communicates, through passage 33, with passage 20, and hence with air chambers 16, 18. Similarly, recess 28 communicates through passage 35, with passage 22 and hence with the air chambers. Recess 26 connects with passage 37, drilled laterally in partition 14 and connecting with passage 38 in valving extension 41, terminating at valve seat 43.

The circumferential edge of lower rubber diaphragm 44 is clamped between annular shoulder 46, formed as part of the housing, and annular shoulder 48, the top surface of bottom cap 50. Externally and internally threaded bottom cap 50 is received in the housing and accommodates externally threaded bottom end plug 52. One end of lower spring 54 surrounds upstanding boss 56 and abuts against the upper surface of bottom end plug 52, while the other end of lower spring 54 abuts against cup shaped shell 58, which in turn abuts against lower rubber diaphragm 44.

Externally and internally threaded top cap 60 is received in internally threaded depression 62, formed in the housing, and accommodates externally and internally threaded annular insert 64. Washer 100 is clamped between top cap 60 and housing 12. Externally threaded top end plug 66 is screwed into the interior of annular insert 64.

The lower end of pressure indicating rod 68 rests on upper rubber diaphragm 70, the circumferential edge of which is clamped between retainer ring 72, abutting with the lower surface of annular insert 64, and upstanding surface 74, formed within top cap 60.

The upper end of upper spring 76 surrounds boss 78 and abuts against annular shoulder 80, formed on top end plug 66, while the lower end of upper spring 76 abuts against annular flange 82, formed integral with pressure indicating rod 68.

Passage 84 extends from upstanding surface 74 to upper air chamber 16.

Plastic bubble 86 snaps into recess 88 provided in top cap 60, and dust cover 90 snaps into recess 92 provided in bottom cap 50.

Top end plug 66 and bottom end plug 52 are provided on their exposed surfaces with kerfs 94, 96, allowing rotation by a conventional screw driver to increase or decrease the tension existing in upper and lower springs 76, 54. Vent 98 extends through bottom end plug 52 and boss 56.

Operation

Pressure equalizing valve 10 is conveniently and securely attached to the rim of a conventional dual tire wheel via mounting bolt 42.

Assuming that the tension in upper and lower springs 76, 54 has been properly calibrated and adjusted for the performance desired, and assuming installation on an already inflated pair of dual tires, the mechanic will first connect tire connection 34 to one of the tires. The air pressure existing in this tire will then be communicated through passages 39, 37, 38 and will act on lower rubber diaphragm 44 at valve seat 43.

Lower rubber diaphragm 44 is urged upwardly against valve seat 43 by the tension existing in lower spring 54 acting upon cup shaped shell 58. With only the first tire connected, the air pressure existing at valve seat 43, acting over only the cross-sectional area of passage 38, will be insufficient to overcome the upward force exerted by lower spring 54. Thus, lower rubber diaphragm 44 will maintain an air tight seal against valve seat 43.

The mechanic then connects the second tire to tire connection 32, and the air pressure in passages 36, 33, 20, 22, and upper and lower air chambers 16, 18, equalizes at the pressure existing in that tire. Due to the fact that the air pressure from the second tire is now acting on the much larger exposed upper surface of lower rubber diaphragm 44, the force exerted by lower spring 54 will be overcome to a degree sufficient to cause lower rubber diaphragm 44 to assume a straight unflexed configuration, thereby breaking contact with valve seat 43. With the airtight seal broken, the two tires are put in fluid communication and the air pressure in them is equalized.

Lower rubber diaphragm 44 will remain in an unflexed configuration only so long as the pressure in the air chambers equals or exceeds a predetermined air pressure, selected by proper adjustment of lower end plug 52. Should a leak or puncture develop in either of the two tires, or their connecting hoses, and the pressure drop below the predetermined level, lower rubber diaphragm 44, urged by the tension of lower spring 54, will return to an arcuate configuration and, by contact with valve seat 43, interrupt the fluid communication between the two tires. Vent 98 assures that the lower surface of diaphragm 44 is acted upon by atmospheric pressure.

Washer 100 and the circumferential edge of upper rubber diaphragm 70 provide air tight seals. By virtue of passage 84, the air pressure existing at the underside of upper rubber diaphragm 70 is equal to that existing in both tires. The amount by which pressure indicating rod 68 protrudes beyond the upper edge of top end plug 66 is related to the compressed length of upper spring 76, which is in turn a function of the air pressure existing in the dual tires. Advancing or retracting upper end plug 66 enables calibration of the pressure reading device.

It has been found that accurate pressure readings will result when the exposure of pressure indicating rod 68 varies from zero up to approximately 6 mm. At 55 psi to 60 psi the pressure indicating rod will not be exposed. At 70 psi the pressure indicating rod will protrude approximately 2 mm. At 85 psi the pressure indicating rod will protrude approximately 4 mm, and at 100 psi it will protrude approximately 6 mm.

If a fleet operator using 100 psi in the tires finds that the exposure of the pressure indicating rod has dropped to approximately 2 mm it means that the pressure in the tires has dropped to approximately 70 psi, and the tires must be inflated or checked for leaks. If the pressure indicating rod goes out of sight it means that the pressure in the tires has dropped to, or below, 55 or 60 psi. This means excessive air loss and each tire should be checked for leaks.

Other embodiments are within the following claims.

I claim:

1. A pressure equalizing valve, comprising:
   a housing defining a chamber,
      said housing having first and second passages therethrough opening into said chamber;
   a valve seat in said chamber surrounding the opening of said second passage thereinto;
   a diaphragm having its periphery sealed to said housing and forming a wall of said chamber adjacent to said valve seat;
   resilient means on the side of said diaphragm opposite said valve seat for urging said diaphragm against said seat with a predetermined force, to seal said second passage from said chamber, and hence from said first passage; and
   an indicator mounted on said housing and having a pressure responsive portion in communication with said chamber for indicating when the air pressure therein is below a predetermined value just sufficient to overcome said predetermined force and unseal said second passage,
   said valve further comprising a partition dividing said chamber into first and second compartments respectively communicating with said diaphragm and said pressure responsive portion of said indicator, said partition having a permanently open third passage therethrough connecting said compartments.

2. The valve of claim 1 wherein said indicator comprises means for indicating values of pressure in said chamber over a range of pressures above and below said predetermined value.

3. The valve of claim 1 wherein said indicator comprises a second diaphragm and a pressure indicator rod in contact with a first side of said second diaphragm, and a portion of said housing adjacent said second diaphragm has a passage therethrough communicating between the second side of said second diaphragm and said chamber.

4. The valve of claim 3 wherein said indicator is mounted in a cap, said cap being attached to said housing to form a removable portion thereof.

5. The valve of claim 1 wherein said means for urging said diaphragm against said seat comprise a cap attached to said housing and removable therefrom, and a spring mounted within said cap.

6. The valve of claim 5 wherein one end of said spring is in contact with an insert threaded into said cap, said insert being capable of rotation relative to said cap whereby the stress existing in said spring may be calibrated over a range of values.

7. The valve of claim 5 wherein the periphery of said diaphragm is sandwiched between said housing and said cap to provide said sealing of said periphery to said housing.

8. The valve of claim 1 further characterized in that said first passage communicates with said third passage.

9. The valve of claim 1 further characterized in that said second passage has a first portion extending within said partition parallel to said diaphragm, and a second portion extending within said partition perpendicular to said diaphragm, the termination of said second portion being surrounded by said valve seat.

10. The valve of claim 9 further comprising a valving extension on and perpendicular to said partition, said second portion of said second passage passing through said valving extension and said valve seat being the termination of said valving extension adjacent said diaphragm.

11. The valve of claim 10 further characterized in that said valving extension is formed integral with said partition.

12. The valve of claim 1 further comprising a mounting bolt attached to said housing.

* * * * *